US012444419B1

(12) United States Patent
Singh

(10) Patent No.: US 12,444,419 B1
(45) Date of Patent: Oct. 14, 2025

(54) METHOD AND APPARATUS FOR GENERATING TEXT FROM AUDIO

(71) Applicant: Citrix Systems, Inc., Fort Lauderdale, FL (US)

(72) Inventor: Manbinder Pal Singh, Coral Springs, FL (US)

( * ) Notice: Subject to any disclaimer, the term of this patent is extended or adjusted under 35 U.S.C. 154(b) by 789 days.

(21) Appl. No.: 17/644,608

(22) Filed: Dec. 16, 2021

(51) Int. Cl.
*G10L 13/08* (2013.01)
*G10L 15/18* (2013.01)
*G10L 15/26* (2006.01)

(52) U.S. Cl.
CPC .......... *G10L 15/26* (2013.01); *G10L 15/1815* (2013.01)

(58) Field of Classification Search
CPC ......... G10L 15/26; G06F 40/35; G06F 40/169
See application file for complete search history.

(56) References Cited

U.S. PATENT DOCUMENTS

| | | |
|---|---|---|
| 6,236,970 B1 | 5/2001 | Imai |
| 6,381,568 B1 | 4/2002 | Supplee |
| 6,405,168 B1 | 6/2002 | Bayya |
| 6,477,493 B1 | 11/2002 | Brooks |
| 6,480,191 B1 | 11/2002 | Balabanovic |
| 6,490,561 B1 | 12/2002 | Wilson |
| 8,917,838 B2 * | 12/2014 | Midtun .................. H04M 3/56 379/142.15 |
| 11,763,823 B2 * | 9/2023 | Nareddy ............. G06F 16/3344 704/235 |
| 12,125,487 B2 * | 10/2024 | Bradley ................ G06F 40/284 |
| 2002/0010916 A1 | 1/2002 | Thong |
| 2003/0054802 A1 | 3/2003 | Xie |
| 2003/0055634 A1 | 3/2003 | Hidaka |
| 2004/0015352 A1 | 1/2004 | Ramakrishnan |
| 2004/0071344 A1 | 4/2004 | Lui |
| 2005/0086060 A1 | 4/2005 | Gleason |
| 2006/0074663 A1 | 4/2006 | Shao |
| 2006/0217966 A1 | 9/2006 | Hu |
| 2007/0204285 A1 | 8/2007 | Louw |
| 2010/0121637 A1 | 5/2010 | Roy |

(Continued)

FOREIGN PATENT DOCUMENTS

| | | |
|---|---|---|
| EP | 0811906 | 12/1997 |
| EP | 0811906 A1 | 12/1997 |

(Continued)

OTHER PUBLICATIONS

Google, "Dictomate-MP3 Voice Recorder," Android Applications on Google Playpp. 1-2.

(Continued)

*Primary Examiner* — Daniel Abebe

(57) ABSTRACT

A method comprising: detecting a first event with use of a sensor, the first event to occur while audio data is output on a computing device, the audio data including speech; identifying a first location in a transcript of the speech from the audio data based on a signal from the sensor that detected an occurrence of the first event; identifying a portion of the transcript that includes the first location based on one or more timestamps that define the portion of the transcript relative to the first location; generating a link to audio that is associated with the extracted portion of the transcript; and providing the extracted portion of the transcript and the link to an application.

17 Claims, 11 Drawing Sheets

(56) References Cited

U.S. PATENT DOCUMENTS

| | | |
|---|---|---|
| 2012/0022865 A1 | 1/2012 | Milstein |
| 2022/0093101 A1* | 3/2022 | Krishnan ............... G06V 40/20 |
| 2023/0223016 A1* | 7/2023 | Konam ................ G06F 40/284 |
| | | 704/231 |
| 2024/0126994 A1* | 4/2024 | Deilamsalehy ......... G06F 40/30 |

FOREIGN PATENT DOCUMENTS

| | | |
|---|---|---|
| WO | 0063879 | 10/2000 |
| WO | 0063879 A1 | 10/2000 |

OTHER PUBLICATIONS

Imesart S.a.r.l., "Audio Memos Free—The Voice Recorder," Application Store on iTunes, iTunes Previewpp. 1-3.

International Search Report and Written Opinion for App. No. PCT/US2015/050176, dated Dec. 15, 2015, 14 pages..

KendiTech, "Voice Memos for iPad," Application Store on iTunes, iTunes Previewpp. 1-2.

Kirill Sakhnov et al, "Dynamical Energy-Based Speech/Silence Detector for Speech Enhancement Applications", Proceedings of the World Congress on Engineering WCE 2009, (Jul. 3, 2009), URL: http://www.iaeng.org/publication/WCE2009/WCE2009_pp801-806.pdf, (Nov. 21, 2014), XP055154230.

Kirill Sakhnov et al: "Dynamical Energy-Based Speech/Silence Detector for Speech Enhancement Applications", Proceedings of the World Congress on Engineering WCE 2009, Jul. 3, 2009 (Jul. 3, 2009), Retrieved from the Internet: URL:http://www.iaeng.org/publication/WCE2009/WCE2009_pp801-806.pdf [retrieved on Nov. 21, 2014].

Pichak co., "Recordium Pro," Application Store on iTunes, iTunes Previewpp. 1-3.

Thapliyal, et al., "Computer System Employing Speech Recognition for Detection of Non-Speech Audio," U.S. Appl. No. 13/929,375, filed Jun. 27, 2013.

Thapliyal, et al., "Generating Electronic Summaries of Online Meetings," U.S. Appl. No. 14/081,157, filed Nov. 15, 2013.

US Non-Final Office Action for U.S. Appl. No. 14/487,361, dated Feb. 18, 2015, 34 pages.

US Non-Final Office Action for U.S. Appl. No. 14/487,361, dated Nov. 21, 2014, 10 pages.

* cited by examiner

WATER, FOOD, AND A WARM LAYER OF CLOTHES.
I ALSO WANT TO ADD THAT YOU MIGHT WANT TO BRING A CAMERA TO TAKE PHOTOS.

| START INPUT | END INPUT | DEVICE CONTEXT |
|---|---|---|
| SHAKE MOTION | SHAKE MOTION | WALKING |
| LEFT SLIDE | RIGHT SLIDE | TRANSIT |
| SINGLE TAP | DOUBLE TAP | DEFAULT |
| ELBOW-UP MOTION | ELBOW-UP MOTION | RUNNING |

FIG. 9

METHOD AND APPARATUS FOR GENERATING TEXT FROM AUDIO

BACKGROUND

Smartphones and other computing devices enable users to participate in telephone calls and other types of communications sessions. In addition, the same devices enable users to consume various types of pre-recorded media, such as podcasts, online lectures, as wells other media that have an audio component. Users can participate in telephone calls or just listen to audio when traveling, driving, or engaging in another activity.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided comprising: detecting a first event with use of a sensor, the first event to occur while audio data is output on a computing device, the audio data including speech; identifying a first location in a transcript of the speech from the audio data based on a signal from the sensor that detected an occurrence of the first event; identifying a portion of the transcript that includes the first location based on one or more timestamps that define the portion of the transcript relative to the first location; generating a link to audio that is associated with the extracted portion of the transcript; and providing the extracted portion of the transcript and the link to an application.

According to aspects of the disclosure, a system is provided comprising: a memory; and at least one processor operatively coupled to the memory, the at least one processor being configured to perform the operations of: detecting a first event with use of a sensor, the first event to occur while audio data is output on a computing device, the audio data including speech; identifying a first location in a transcript of the speech from the audio data based on a signal from the sensor that detected an occurrence of the first event; identifying a portion of the transcript that includes the first location based on one or more timestamps that define the portion of the transcript relative to the first location; generating a link to audio that is associated with the extracted portion of the transcript; and providing the extracted portion of the transcript and the link to an application.

According to aspects of the disclosure, a non-transitory computer-readable medium storing one or more processor-executable instructions, which, when executed by at least one processor, cause the at least one processor to perform the operations of: detecting a first event with use of a sensor, the first event to occur while audio data is output on a computing device, the audio data including speech; identifying a first location in a transcript of the speech from the audio data based on a signal from the sensor that detected an occurrence of the first event; identifying a portion of the transcript that includes the first location based on one or more timestamps that define the portion of the transcript relative to the first location; generating a link to audio that is associated with the extracted portion of the transcript; and providing the extracted portion of the transcript and the link to an application.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIGS. 7, 8A, 8B, and 8C are flowcharts of illustrative processes for generating text from audio, according to aspects of the disclosure; and FIG. 9 is a diagram of a table that illustrates a context-dependent input scheme, according to aspects of the disclosure.

DETAILED DESCRIPTION

Figure 1:
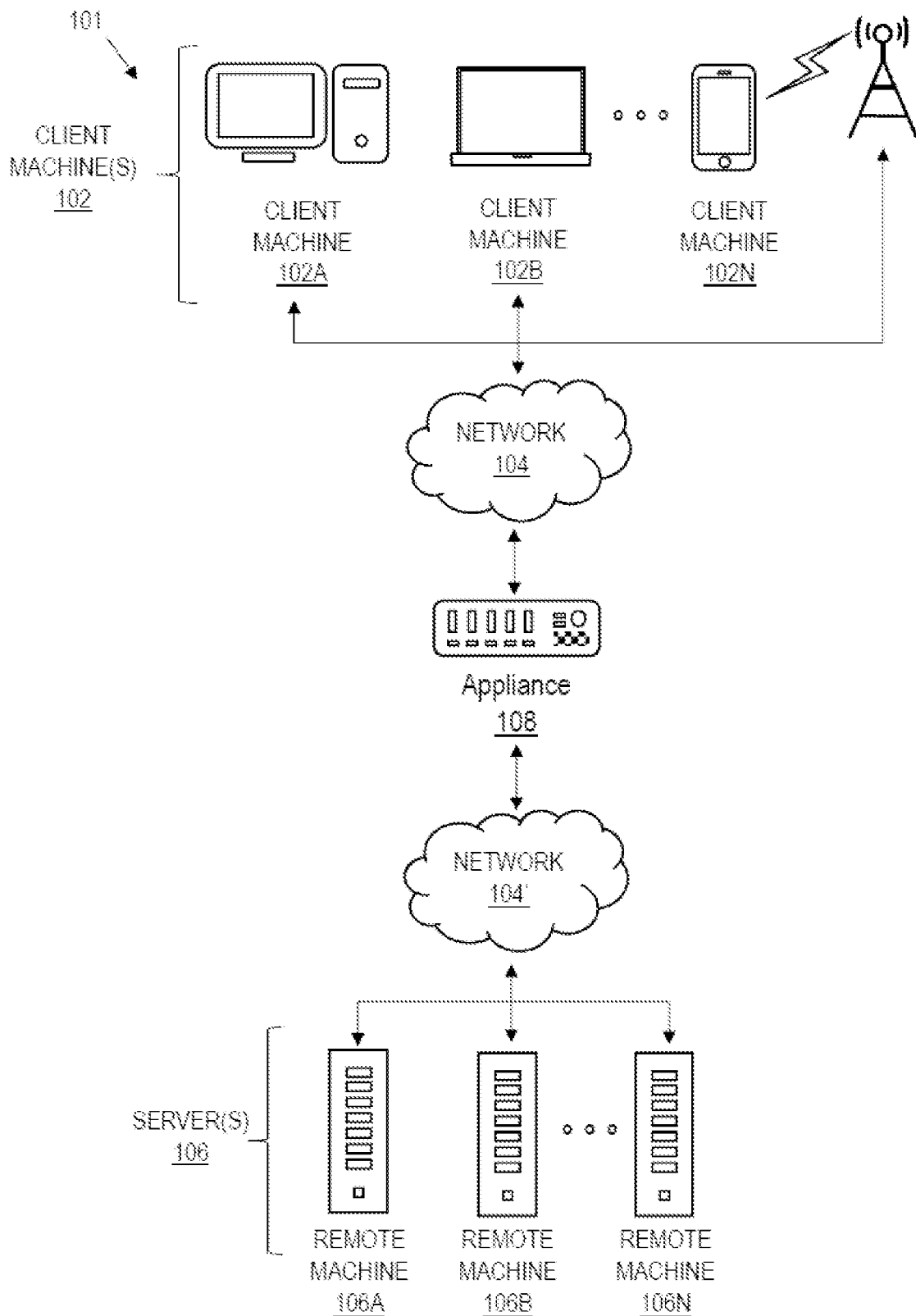
FIG. 1 is a diagram illustrating an example network environment of computing devices in which various aspects of the disclosure may be implemented, in accordance with an embodiment of the present disclosure.

Referring now to FIG. 1, shown is an example network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VOIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
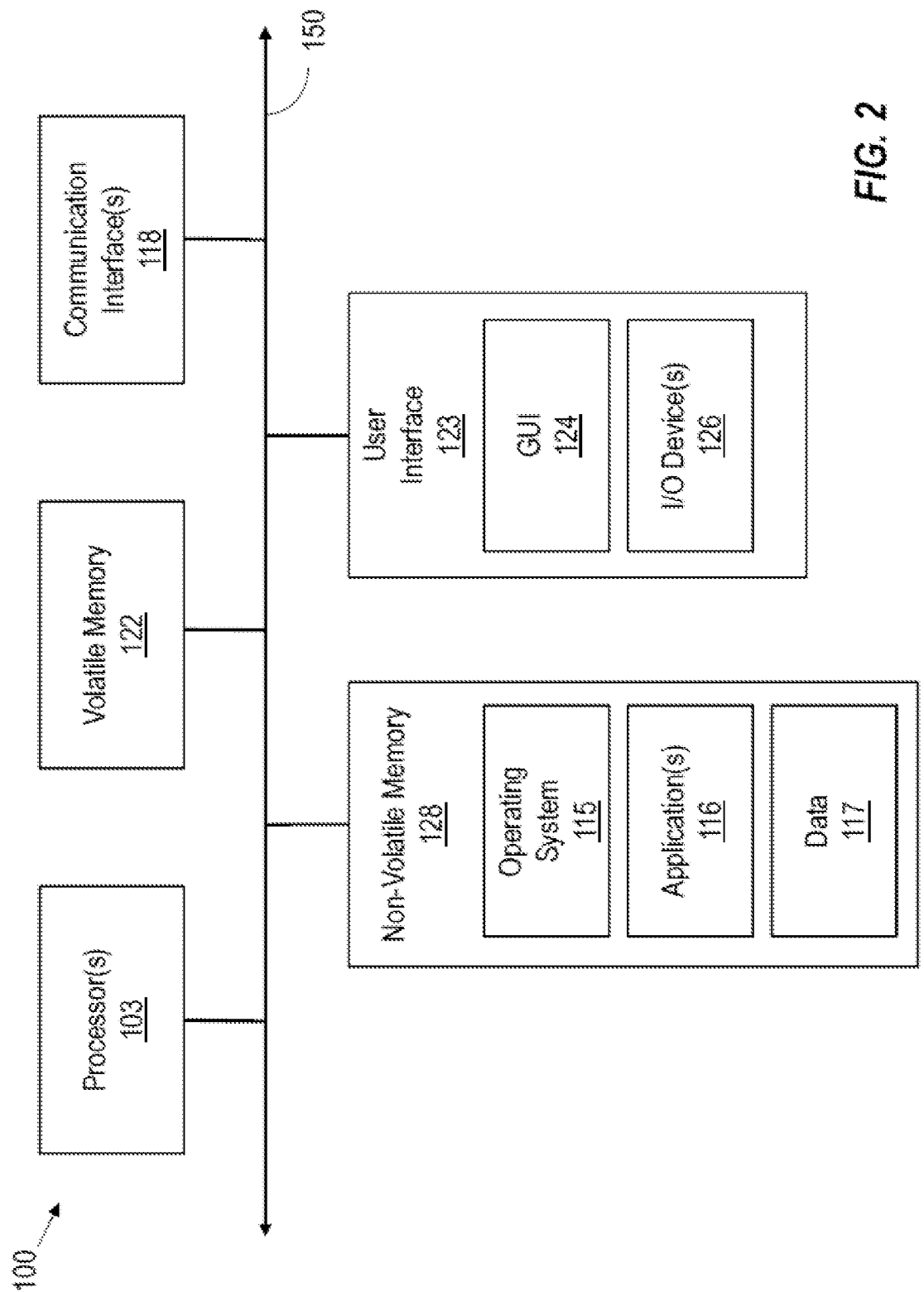
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an example client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
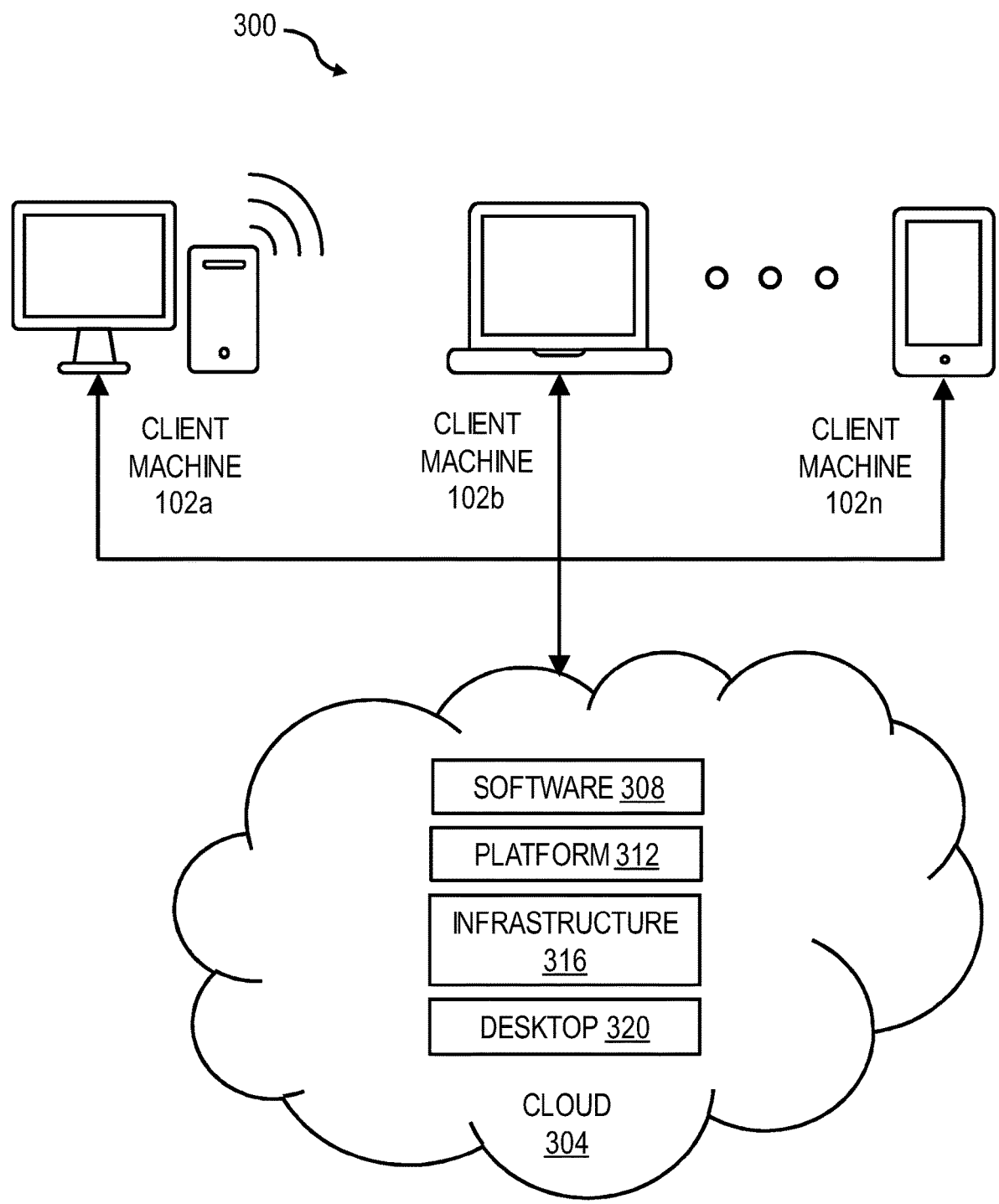
FIG. 3 is a diagram of a cloud computing environment in which various aspects of the concepts described herein may be implemented.

Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 102a-102n (such as those described above) are in communication with a cloud network 304. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 102. In some embodiments, the cloud computing environment 300 can include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
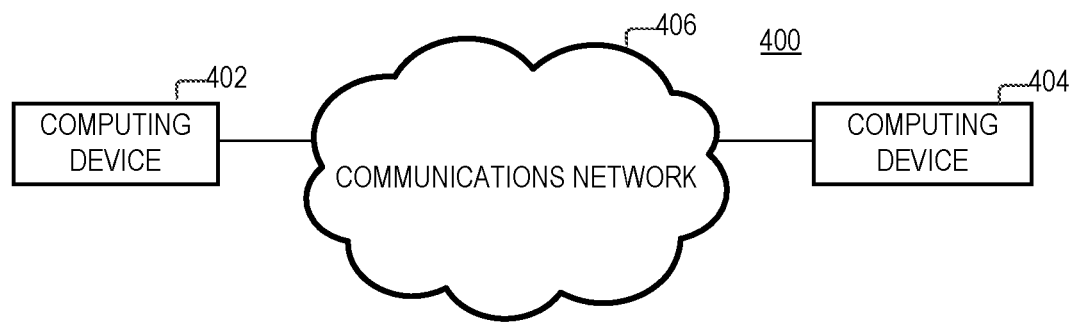
FIG. 4A is a diagram of an example of a system for generating text from audio, according to aspects of the disclosure.

FIG. 4A shows an illustrative system 400 for generating text from audio, according to one implementation. As illustrated, the system 400 may include a computing device 402 that is coupled to a computing device 404 via a communications network 406. According to the example of FIG. 4A, the device 402 is a smartphone. However, alternative implementations are possible in which the device 402 includes a laptop computer, a desktop computer, an automotive head unit, and/or any other suitable type of computing device. According to the example of FIG. 4A, the device 404 is also a smartphone. However, alternative implementations are possible in which the device 404 includes a laptop computer, a desktop computer, and/or any other suitable type of computing device. The network 406 may include one or more of the Internet, a local area network (LAN), a wide area network (WAN), a wireless network, and/or any other suitable type of communications network.

Figure 4B:
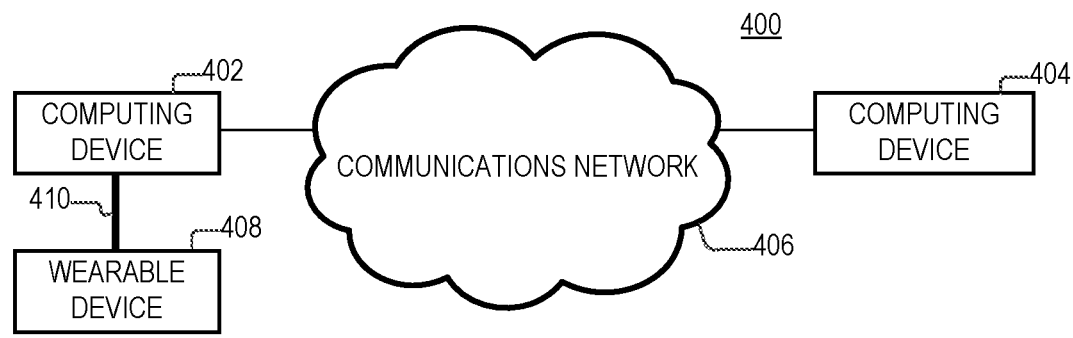
FIG. 4B is a diagram of another illustrative system for generating text from audio, according to aspects of the disclosure.

As illustrated in FIG. 4B, according to another implementation, the system 400 may further include a wearable device 408 that is coupled to the device 402 via a secondary connection 410. According to the example of FIG. 4B, the wearable device 408 is a smartwatch. However, alternative implementations are possible in which the wearable device 408 is another type of wearable device. The connection 410 may include one or more of a Bluetooth connection, a WiFi connection, and/or any other suitable type of wireless or wired connection. According to the example of FIG. 4B, the secondary connection 410 is established directly between the device 402 and the wearable device 408. However, alternative implementations are possible in which the secondary connection 410 is established over the Internet or by using another type of communications network.

As is discussed further below, the device 402 may be configured to generate text notes based on the contents of audio that is being output on the device 402. In the example of FIG. 4A, the generation of text notes may be triggered by user input that is received directly at the device 402. On the other hand, in the example of FIG. 4B, the generation of text notes may in addition be triggered by user input that is received at the wearable device 408.

In some implementations the device 402 may be the same or similar to the client machine 102A (shown in FIG. 1) and the device 404 may be the same or similar to the client machine 102N (shown in FIG. 1). Additionally or alternatively, in some implementations, the device 402 may be the same or similar to the client machine 102A (shown in FIG. 1) and the device 404 may be the same or similar to the remote machine 106A (shown in FIG. 1). Additionally or alternatively, in some implementations the device 402 may be the same or similar to the client machine 102A (shown in FIG. 1) and the device 404 may be the same or similar to the appliance 108 (shown in FIG. 1). Additionally or alternatively, in some implementations, the device 402 may be the same or similar to the client machine 102A (shown in FIG. 3) and the device 404 may be the same or similar to the cloud 304 (shown in FIG. 3). In the latter case, the device 404 may include one or more nodes in a cloud that are configured to provide streaming service to the device 402 and/or execute the note generator 424 (shown in FIG. 4C).

Figure 4C:
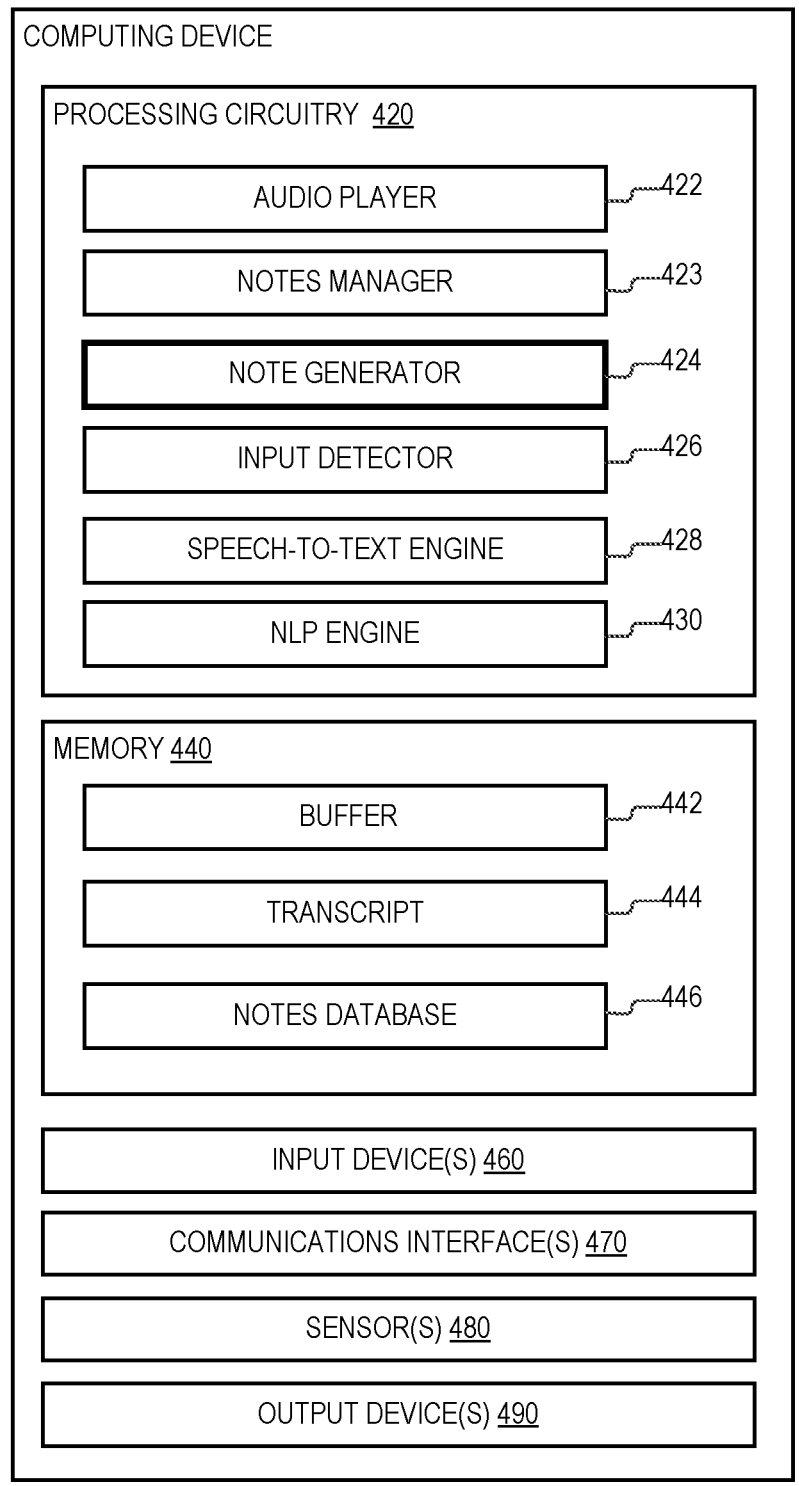
FIG. 4C is a diagram of an illustrative computing device for generating text from audio, according to aspects of the disclosure.

FIG. 4C illustrates the computing the device 402 in further detail, according to aspects of the disclosure. As illustrated, the computing the device 402 may include a processing circuitry 420, a memory 440, one or more input devices 460, one or more communications interfaces 470, one or more sensors 480, and one or more output devices 490.

The processing circuitry 420 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 440 may include any suitable type of volatile and/or non-volatile memory. In some implementations, the memory 130 may include one or more of a random-access memory (RAM), a dynamic random memory (DRAM), a flash memory, a hard drive (HD), a solid-state drive (SSD), a network accessible storage (NAS), and or any other suitable type of memory device. The input device(s) 460 may include one or more input devices, such as a touchpad, a camera, or a microphone. The communications interface(s) 470 may include any suitable type of communications interface, such as one or more Ethernet adapters, one or more Wi-Fi adapters (e.g., 802.1414 adapters), and one or more Long-Term Evolution (LTE) adapters, for example. The sensor(s) 480 may include one or more sensors, such as an illumination sensor, a humidity sensor, a pressure sensor, a location sensor, a gravity sensor, an accelerometer, and/or any other suitable type of sensor. The output device(s) 490 may include one or more of a speaker, a display, a tactile feedback generator, etc.

The processing circuitry 420 may be configured to execute an audio player 422, a notes manager 423, a note generator 424, an input detector 426, a speech-to-text engine 428, and a natural language processing (NLP) engine 430. The memory 440 may be configured to store a buffer 442, a transcript 444, and a notes database 446.

The audio player 422 may include any suitable software application (or part thereof) that is configured to receive audio data (e.g., an audio stream) and/or output the audio data with use of one or more speakers of the device 402. The audio data may include an audio stream that is associated with a telephone call, an audio stream that is associated with a video file, and/or any suitable type of audio stream. The audio player 422 may include one or more of a telephony application, a teleconference application, a web browser, a media player, and/or any other suitable type of application. In other words, the audio player 422 may include any software (or part thereof) that is configured to output audio on a speaker of the device 402. The audio may be live audio or pre-recorded audio.

The transcript 444 may be text of speech that is contained in audio data (or other audio that being output on the device 402). The audio data may be one that is output on a speaker of the device 402 by the audio player 422. The transcript 444 may be generated by the speech-to-text engine 428. The transcript 444 may include timestamps that identify the time when individual words or sentences in the transcript 444 are spoken (or output on a speaker of the device 402). Examples of contents of the transcript 444 are provided further below with respect to FIGS. 5A and 6A.

The buffer 442 may include a location in the memory 440 where audio data is stored (e.g., by the audio player 422) before being output on a speaker of the device 402. In instances in which live audio is being output by the audio player 422 (such as audio that is produced over the course of a telephone/video call), the transcript 444 may be generated based on the data that is available in the buffer 442.

Specifically, the speech-to-text engine 428 may continuously draw data that is being added to the buffer 442, transcribe the data to text, and append the transcribed data at the end of the transcript 444. In instances in which the audio that is output by the audio player is pre-prerecorded, the transcript may also be generated in real-time (or near-real-time) as the audio is being output or it may be generated before or after the audio is output. In some implementations, the buffer 442 may be configured to retain data after the data has been rendered on a speaker of the device 402. For example, the buffer may be configured to store the last 2-3 minutes of audio that have been output on the speaker of the device 402.

The notes manager 423 may include software (e.g., executable code or scripts) for managing notes derived from text of transcript 444. Typically, a note would be a snippet of text (e.g., under 250 words). However, the present disclosure is not limited to any specific length for the notes that are managed by the notes manager 423 (and/or generated by the note generator 424). At least some of the notes that are managed by the notes manager 423 may be generated by the note generator 424). Any such note may include text of speech that is contained in audio data, which is being output on a speaker the device 402 (by the audio player 422). Any such note may include speech that is spoken (or output) roughly at the time when a specific user input is received that triggers the generation of the note. The text that is part of the note may be extracted (by the note generator 424) from the transcript 444 based on timestamps that are available in the transcript 444.

In operation, the notes manager 423 may include software (e.g., executable code or scripts) configured to receive a note that is generated by the note generator 424 and store the note in the notes database 446. The note generator 424 may be further configured to retrieve the note from the notes database 446 and display it on a display device of the device 402. The notes manager 423 may include one or more of a sticky notes application, a calendar application, productivity software, scheduling software, data management software, and/or any other type of software. Stated succinctly, the present disclosure is not limited to any specific implementation of the notes manager 423.

The note generator 424 may include software (e.g., executable code or scripts) for generating notes based on the transcript 444. In operation, the note generator 424 may detect inputs (e.g., a predetermined user input) that triggers the generation of a note. Next, in response to the input, the note generator 424 may extract, from the transcript 444, a snippet of text that is spoken roughly at the time when the input is received. And finally, the note generator may provide the generated note to the notes manager 423.

The input detector 426 may be configured to detect input that is received at the computing the device 402. The input detector 426 may include software that is configured to generate first events that trigger the generation of notes by the note generator 424 (e.g., see events 502 and 602 that are shown in FIGS. 5A-6A.) The input detector 426 may be further configured to generate second events that cause the generation of a note to stop (e.g., see events 504 and 604 that are shown in FIGS. 5A-6A.)

The generation of the first events by the input detector 426 may be performed in response to a signal that is generated by a touchpad or any of the sensor(s) 480 of the device 402. Furthermore, the generation of the first events by the input detector 426 may be performed in response to a signal that is generated by a touchpad or one or more sensors of the wearable device 408. The generation of the second events by the input detector 426 may be performed in response to a signal that is generated by a touchpad or any of the sensor(s) 480 of the device 402. Furthermore, the generation of the second events by the input detector 426 may be performed in response to a signal that is generated by a touchpad or one or more sensors of the wearable device 408.

The speech-to-text engine 428 may include software that is configured to generate the transcript 444 from audio data. The natural language processing (NLP) engine may implement a neural network for analyzing the transcript 444. As is discussed further below with respect to FIG. 8C, the neural network may be used by the note generator 424 to identify a semantically-continuous block of sentences that is part of the transcript 444.

Figure 5A:
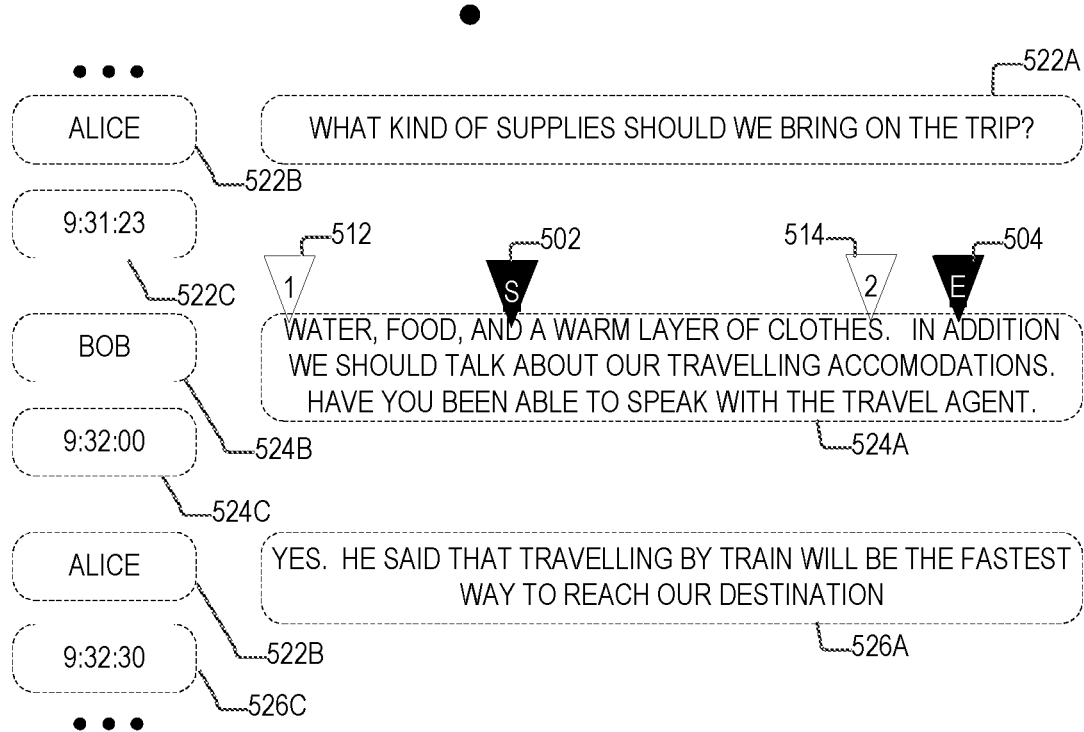
FIG. 5A is a diagram of an illustrative speech-to-text transcript that may be generated according to aspects of the disclosure.
Figure 5B:
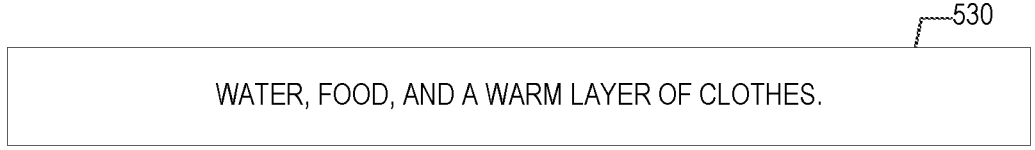
FIG. 5B is a diagram of an illustrative note that is generated based on the speech-to-text transcript of FIG. 5A, according to aspects of the disclosure.

FIGS. 5A-B illustrate the operation of the note generator 424, according to aspects of the disclosure. Specifically, FIGS. 5A-B illustrate an example of a process that may be executed by the note generator 424 (and/or the device 402) for the purpose of generating a note 530 (shown in FIG. 5B).

In the example of FIG. 5A, the transcript 444 includes a transcription of a telephone call. Participating in the telephone call are the user of device 402 (e.g., Alice) and the user of device 404 (e.g., Bob). The transcript 444 may include segments 522A, 524A, and 526A. Segment 522A includes the transcription of words that are spoken by user Alice. Segment 522A is associated with a speaker ID 522B and a timestamp 522C. Segment 524A includes the transcription of words that are spoken by user Bob. Segment 524A is associated with a speaker ID 524B and a timestamp 524C. Segment 526A includes the transcription of words that are spoken by user Alice. Segment 526A is associated with a speaker ID 522B and a timestamp 526C. According to the example of FIG. 5A, the transcript 444 is generated in real-time or near-real-time over the course of the telephone call between users Alice and Bob. As noted above, the transcript 444 may be generated based on audio data that is stored in the buffer 442.

Shown in FIG. 5A is an event 502. According to the present example, event 502 is generated in response to user Alice shaking the device 402 which is detected by device 402. The event 502 is generated as the word "and" spoken or output from a speaker of device 402. In response to the event 502, a note 530 is generated by the note generator 424 (shown in FIG. 5B). Note 530 is generated by extracting a portion of the transcript 444, as shown. The text that forms note 530, starts at location 512 in the transcript 444. Location 512 is identified in response to the event 502. Location 512 corresponds to the word "water" in the transcript 444. The text that forms note 530 ends at location 514 in the transcript 444. Location 514 is identified in response to another event 504. Event 504 is generated in response to user Alice shaking the device 402 for a second time which is detected by device 402. In the example of FIG. 5, event 504 is detected while the word "addition" is spoken or output from a speaker of the device 402.

Note 530 may be generated in accordance with the following use case. Consider that user Alice is out for a run. While user Alice is running, she is also participating in a telephone call with user Bob. User Alice wants to ask user Bob an important question about an upcoming trip. However, because user Alice is running, she does not have at her disposal a pen and paper, which would allow her to write down the answer to the question. Furthermore, she cannot stop running and indulge in the user interface of the device 402. For this reason, user Alice shakes the device 402 for a first time after she has asked the question, thus causing the device to generate the note 530, which contains the answer to the question. In response to the first shake, the device 402 begins generating the note. After user Bob has finished answering the question, user Alice may shake the device 402 again, thus notifying the note generator 424 that the text that needs to be included in the note 530 corresponds to speech that is spoken roughly between the two shakes. As noted above, after the note 530 is generated by the note generator 424, note 530 may be provided to notes manager 423 for future viewing by user Alice.

Although in the above example, the note 530 is generated in response to the device 402 being shaken, alternative implementations are possible in which the note 530 is generated in response to an elbow-up motion being performed with the device 402. Examples of different types of input that could trigger the generation of note 530 are discussed further below with respect to FIG. 9.

In one aspect, the note generator 424 may process the transcript 444 to determine location 512, which marks the beginning of the text to be included in the note 530. As illustrated in FIG. 5A, the word corresponding to location 512 may be spoken before event 502 is detected. Accordingly, the note generator 424 may set the beginning of the sentence that is being spoken (or output on a speaker of the device 402) as the starting location of the text to be included in note 530 (e.g., the location 512).

In another aspect, the note generator 424 may process the transcript 444 to determine location 512, which marks the end of the text that needs to be included in note 530. As illustrated in FIG. 5A, the word corresponding to location 514 may be spoken before event 504 is detected. Accordingly, the note generator 424 may set the end of the last full sentence that was spoken (or output on a speaker of the device 402) before the event 504 is detected as the ending location of the text that needs to be included in at note 530 (e.g., the location 514).

According to the example of FIGS. 5A-B, the end of the last full sentence that was spoken before the event 504 is identified as location 514 (i.e., the location in the transcript 444 that marks the end that needs to be included in the note 530). However, alternative implementations are possible in which a different heuristic is used to identify location 514 in the transcript 444. For example, in some implementations, the end of the sentence that was being spoken when event 504 is detected may be selected as location 514. As another example, in some implementations, the end of the last sentence that was spoken by a far-end party (e.g., user Bob) before the event 504 is detected may be selected as location 514. As yet another example, in some implementations, the end of the last sentence that was spoken by a far-end party (e.g., user Bob) after the event 504 is detected may be selected as location 514.

According to the example of FIGS. 5A-B, location 514 is identified in response to the event 504, which is generated based on input that is received at device 402. However, alternative implementations are possible in which location 514 is identified automatically, without the user having to provide input that explicitly instructs the note generator 424 to stop generating the note. For example, in some implementations, location 514 may be set as the last word in a sentence spoken by a far-end part (e.g., user Bob) before the user of the device 402 (i.e., Alice) begins speaking again. As another example, the location 514 may be set at the end of a semantically continuous block of sentences that begins at location 512. The semantically-continuous block of sentences may include one or more sentences that have the same topic. As noted above, in some implementations, the NLP engine 430 (shown in FIG. 4C) may be used to identify the end of the semantically-continuous block of sentences.

Although in the example of FIG. 5B, the note 530 includes only text that is extracted from the transcript 444, alternative implementations are possible where the note 530 also includes a link to an audio recording of the speech, which the text in the note is a transcription of. The audio recording may be include a recording of the entire audio data or portion thereof. The term "note" as used throughout the disclosure may refer to one or more of a body of text, a portion of a text transcript, an object that encapsulates a portion of the text transcript, an object that encapsulates a portion of the text transcript, a database entry where a portion of a text transcript and a corresponding link to an audio recording are store.

Figures 6A, 6B:
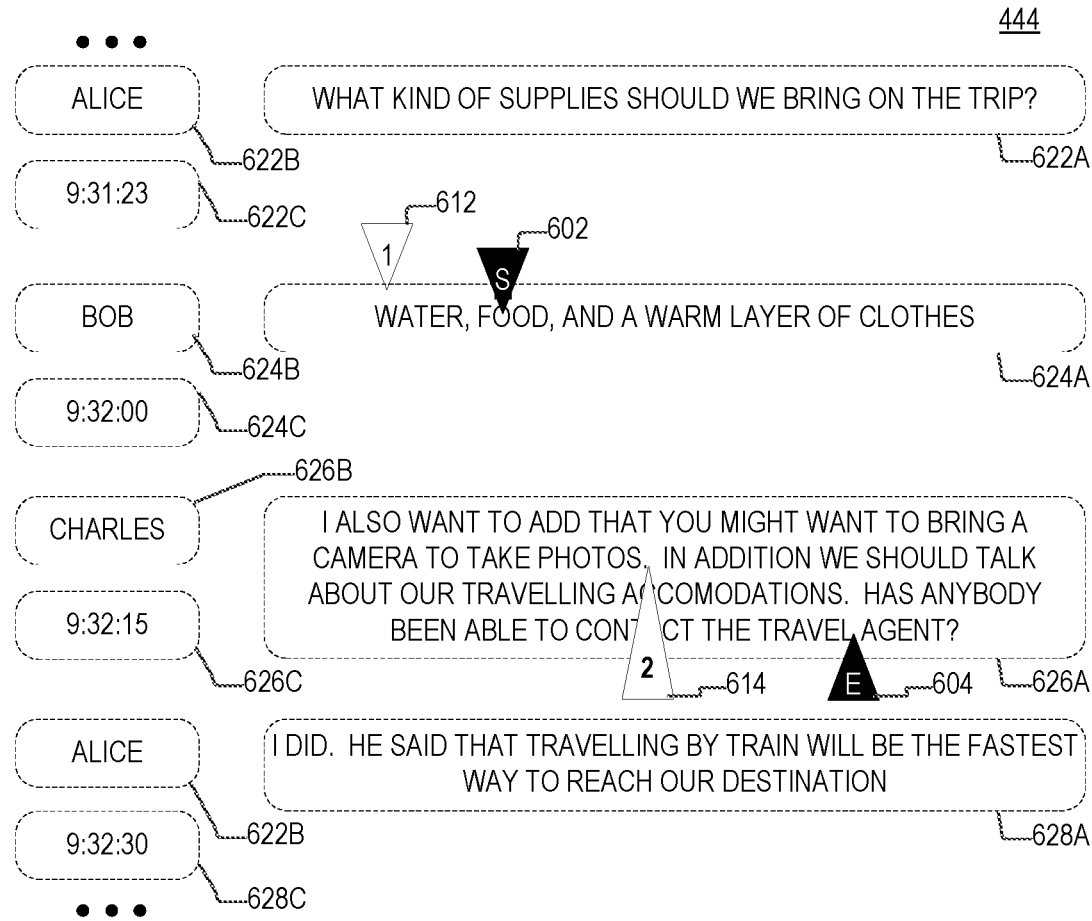
FIG. 6A is a diagram of another illustrative speech-to-text transcript that may be generated according to aspects of the disclosure.
FIG. 6B is a diagram of an illustrative note that is generated based on the speech-to-text transcript of FIG. 6A, according to aspects of the disclosure.

FIGS. 6A-B illustrate other operation of the note generator 424, according to aspects of the disclosure. Specifically, FIGS. 6A-B illustrate an example of a process that may be executed by the note generator 424 (and/or the device 402) for the purpose of generating a note 630 (shown in FIG. 6B).

In the example of FIG. 6A, the transcript 444 includes a transcription of a telephone call. Participating in the telephone call are the user of device 402 (e.g., Alice), the user of device 404 (e.g., Bob), and the user of another device (e.g., Charles). Unlike the telephone call in the example of FIG. 5A, the telephone call presented in the example of FIG. 6A is a three-way telephone call. FIG. 6A is provided to illustrate that a note generated by the note generator 424 may include transcriptions of speech by different people. Furthermore, FIG. 6A is provided to illustrate that the decision, by the note generator 424, of whether to include a particular sentence in a note may depend on whether the sentence pertains to the same topic as other sentences in the note.

In the example of FIG. 6A, the transcript 444 includes segments 622A, 624A, 626A, and 628A. Segment 622A includes the transcription of words that are spoken by user Alice. Segment 622A is associated with a speaker ID 622B and a timestamp 622C. Segment 624A includes the transcription of words that are spoken by user Bob. Segment 624A is associated with a speaker ID 624B and a timestamp 624C. Segment 626A includes the transcription of words that are spoken by user Charles. Segment 626A is associated with a speaker ID 626B and a timestamp 626C. Segment 628A includes the transcription of words that are spoken by user Alice. Segment 628A is associated with a speaker ID 622B and a timestamp 628C. According to the example of FIGS. 6A-B, the transcript 444 is generated in real-time or near-real-time over the course of the telephone call. As noted above, the transcript 444 may be generated based on audio data that is stored in the buffer 442.

Shown in FIG. 6A is an event 602. According to the present example, event 602 is detected in response to user Alice shaking the device 402. Event 602 is generated as the user is uttering the word "food" or when the word "food" is being output from a speaker of the device 402. In response to the event 602, a note 630 is generated by the note generator 424 (shown in FIG. 6B). Note 630 is generated by extracting a portion of the transcript 444, as shown. The text that forms note 630, starts at location 612 in the transcript 444. Location 612 is identified in response to detection of the event 602. Location 612 corresponds to the word "water" in the transcript 444. The text that forms note 630 ends at location 614 in the transcript 444. Location 614 is identified in response to another event 604. Event 604 is generated in response to user Alice shaking the device 402 for a second time. In the example of FIG. 6B, event 504 is detected while the word "travel" is spoken (by user Charles) or output from a speaker of the device 402.

In the example of FIGS. 6A-B, location 612 in the transcript marks the beginning of the text that is included in note 630, and location 614 marks the end of the text. In some implementations, location 612 may be identified in the same or similar manner as location 512. Location 614 may be identified by using the NLP engine 430, and it may be the end of a semantically-continuous block of sentences that is part of the transcript 444. In some respects, FIGS. 6A-B illustrates that the note 630 may include text that is spoken by different people. Although in the example of FIGS. 6A-B the location 614 is identified by using the NLP engine 430, alternative implementations are possible in which location 614 is identified by using a rule-based heuristic. Such rule-based heuristic may provide that any sentence that follows another sentence that is part of a note, and starts with "in addition to" (or another preface that is indicative of semantic continuity) should also be added to the note.

Figure 7:
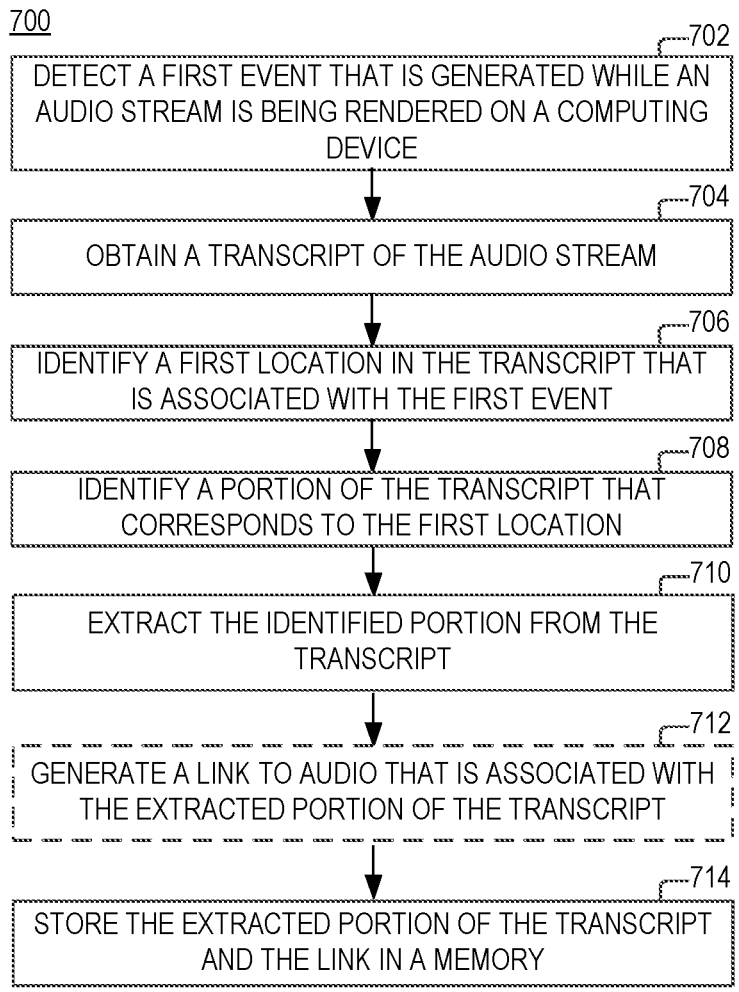

FIG. 7 shows an illustrative process 700 for generating a note, according to aspects of the disclosure. Although in the example of FIG. 7, the process 700 is performed by the note generator 424, alternative implementations are possible in which the process 700 is executed by one or more other entities. Stated succinctly, the process 700 is not limited to being executed by any specific entity or device.

At step 702, the note generator 424 detects that a first event while audio data (e.g., an audio stream) is being output on a speaker of the device 402 (e.g., by the audio player 422). The first event may be generated in response to the user shaking the device 402 and/or any other user input that is provided to the device 402 (e.g., input provided at a touchscreen of the device 402, input provided with a keyboard or mouse of the device 402, input provided via a microphone of the device 402, input provided via an accelerometer or gravity sensor of the device 402, input provided via an optical sensor of the device 402, input provided via a camera of the device 402, etc.). The speaker of the device 402 may include a built-in speaker, a wireless speaker, headphones, and/or any other suitable type of acoustic transducer. The first event may be generated by an input detector, such as the input detector 426 (shown in FIG. 4C). The first event may be the same or similar to one of events 502 and 602, which are discussed above with respect to FIGS. 5A and 6A, respectively.

The audio data may include live audio that is transmitted to the device 402. The live audio may include the audio in a telephone call, the audio in a live broadcast (e.g., a radio or video broadcast), and/or any other suitable type of live audio. Alternatively, the audio data may include pre-recorded audio. For example, the audio data may be part of an audio or video recording of an academic lecture, a recording of a documentary film, and/or any other recording. The audio data, according to the present example, is transmitted to device 402 over the network 106. However, alternative implementations are possible in which the audio data is obtained from a media file that is stored in the memory 440 of the device 402.

At step 704, the note generator 424 obtains a transcript of the audio data. The transcript of the audio data may be obtained by using the speech-to-text engine 428. The obtained transcript may include one or more files (or other objects) that contain text of speech that is spoken in the audio data. The transcript may be the same or similar to the transcript 444 (shown in FIG. 4C). In instances when the audio data is live, the audio data may be generated in real-time, in sync with the output of the audio data on the speaker of the device 402. In instances in which the audio data is pre-recorded, the audio data may be generated at any time. Obtaining the audio transcript may include one or more of retrieving the transcript from a memory, receiving the audio transcript over a commutations network, causing a speech-to-text engine (e.g., the engine 428, etc.) to generate the transcript, and/or any other action that would permit the note generator 424 to gain access to the transcript.

At step 706, the note generator 424 identifies a first location in the audio transcript. The identified first location may be a word or symbol in the transcript, which marks the beginning of text (from the transcript) which would be extracted from the transcript to form the note that is being generated by the process 700. The identified first location may be the same or similar to one of locations 512 and 612, which are discussed above with respect to FIGS. 5A and 6A, respectively. The note may be the same or similar to one of notes 530 and 630, which are discussed above with respect to FIGS. 5B and 6B, respectively.

In some implementations, identifying the first location may include: (i) identifying the time when the first event occurred (or is detected), and (ii) selecting, based on the identified time, one of the words in the transcript as the first location. Additionally or alternatively, in some implementations, identifying the first location may include selecting, as the first location, the starting word in a sentence that was being output when the first event occurred. Additionally or alternatively, in some implementations, identifying the first location may include selecting, as the first location, the word that was being output when the first event occurred (or is detected). Additionally or alternatively, in some implementations, identifying the first location may include selecting, as the first location, the starting word in the first full sentence that is output following the detection of the first event. Additionally or alternatively, in some implementations, identifying the first location may include selecting the starting word of a semantically-continuous block of one or more sentences in the transcript. In some implementations, the semantically-continuous block of sentences may be one that includes the word being spoken (or output on the speaker of device 402) when the first event is generated (or detected). What word/sentence was spoken when may be determined based on timestamps that are part of the transcript. Alternatively, in some implementations, the semantically-continuous block may include only words that are spoken (or output on the speaker of the device 402) after the first event is detected. As noted above, a semantically continuous block of sentences may include one of: (i) a single sentence or (ii) a plurality of consecutive sentences that pertain to the same topic.

At step 708, the note generator 424 identifies a portion of the transcript that corresponds to the first location. Step 708 may be performed in accordance with one of processes 800A-C, which are discussed further below with respect to FIGS. 8A-C.

At step 710, the note generator 424 extracts the identified portion from the transcript.

At step 712, the note generator 424 optionally generates a link to audio that is associated with the extracted portion of the transcript. In some implementations, the link may point to a recording of the audio data. More particularly, the link may point to a recording of the audio data which contains the speech that is transcribed in the portion of the transcript (extracted at step 710). In some implementations, the recording of the audio data may be created by saving the contents of a buffer where the audio data is buffered (such as the buffer 442) as an audio/media file. The generated link may include a uniform resource locator (URL) (or a file path) that corresponds to the file. The link may include an indication of a particular time in the recording, at which the speech transcribed by the extracted portion is spoken. Activating the link may cause the contents of the file to be output on a speaker of the device 402.

At step 714, the note generator 424 stores the link and/or the extracted portion of the transcript in a memory. In some implementations, storing the link and/or the extracted portion of the transcript in a memory may include providing the link and/or the extracted portion of the transcript to the notes manager 423. Additionally or alternatively, in some implementations, storing the link and/or the extracted portion of the transcript in memory may include or storing the link and/or the extracted portion of the transcript into the notes database 446. Additionally or alternatively, in some implementations, storing the link and/or the extracted portion of the transcript in memory may include generating an object (or database entry) that encapsulates the link and/or the extracted portion of the transcript and providing the object to the notes manager 423 (or otherwise storing the object in a memory). In some implementations, step 712 may be omitted. In such implementations, only the extracted portion of the transcript may be stored in the memory.

Figure 8A:
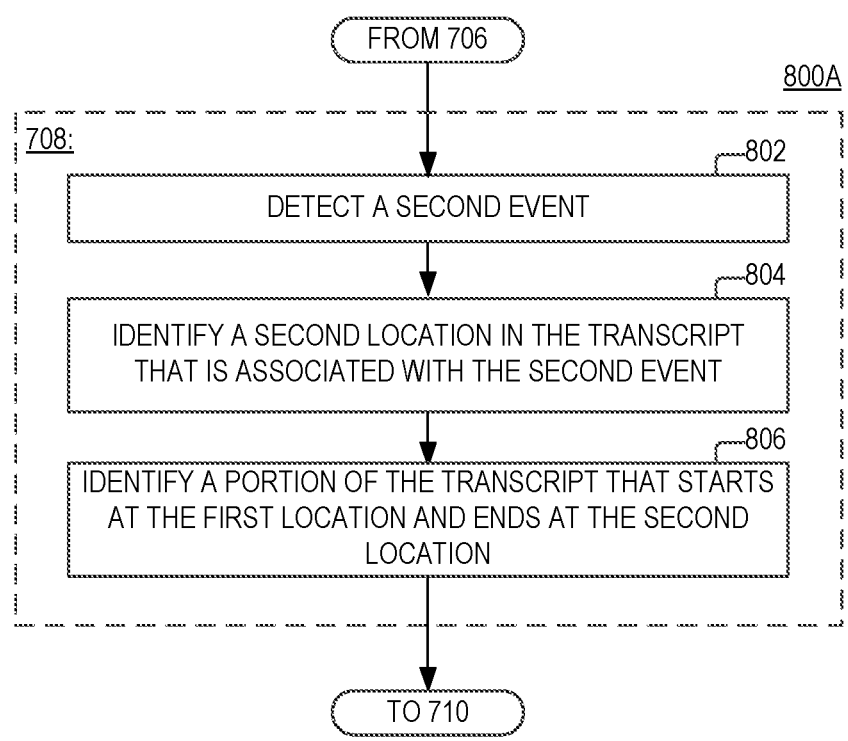

FIG. 8A is a flowchart of an illustrative process 800A for identifying a portion of a transcript that is associated with a first location, as specified by step 708 of the process 700. In the example of FIG. 8A, both the start and end of the transcript portion are identified based on user input events. At step 802, the note generator 424 detects a second event that occurs while the audio data is being output by the device 402. The second event may be generated in response to the user shaking the device 402 and/or in response to any other input that is provided to the device 402 (e.g., input provided at a touchscreen of the device 402, input provided with a keyboard or mouse of the device 402, input provided via a microphone of the device 402, input provided via an accelerometer or gravity sensor of the device 402, input provided via an optical sensor of the device 402, input provided via a camera of the device 402, etc.). The second event may be detected or otherwise identified by an input detector, such as the input detector 426 (shown in FIG. 4C). At step 804, a second location is identified in the transcript that is associated with the second event. In some implementations, the second location in the transcript may be the ending word of a sentence that is being spoken when the second event is detected. Additionally or alternatively, in some implementations, the second location may be the ending word of the last full sentence that was output by the speaker of the device 402 before the second event is detected. Additionally or alternatively, the second location in the transcript may be the end word of the last sentence that is spoken by a particular person before the second event is detected. In some implementations, the second location may be identified based on timestamps that are provided in the transcript or elsewhere. At step 806, a portion of the transcript is identified that starts at the first location (identified at step 706) and ends at the second location (identified at step 804).

Figure 8B:
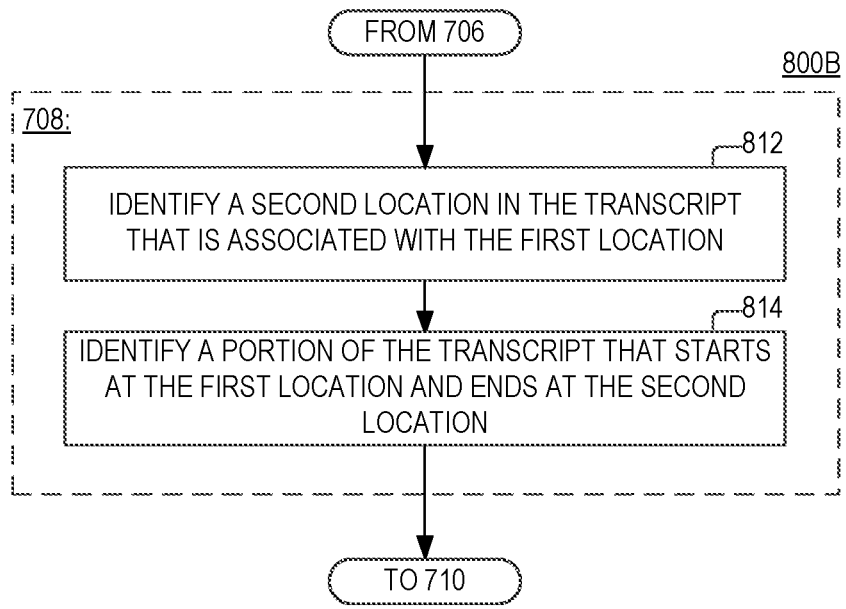

FIG. 8B shows an illustrative process 800B for identifying a portion of a transcript that is associated with a first location, as specified by step 708 of the process 700. In the example of FIG. 8B, the start of the transcript portion is identified based on an input event (detected at step 702) and the end of the transcript portion is identified automatically— i.e., without the provision of additional input. At step 812, the note generator 424 identifies a second location in the transcript (obtained at step 704) that is associated with the first location (identified at step 706). As noted above with respect to step 706, the first location may correspond to a starting word in a first sentence in the transcript. In this regard, in some implementations, the second location may include the last word of a sentence that is spoken by the same person as the starting word. Additionally or alternatively, in some implementations, the second location may include the last word in a sentence that is immediately followed by a question (e.g., a sentence indicating that a speaker has finished providing an answer to a previous question). Additionally or alternatively, in some implementations, the second location may include the last word in a sentence that is immediately followed by a period of silence (e.g., one that exceeds a predetermined length). Additionally or alternatively, in some implementations, the second location may include the last word of the sentence that begins at the first location. At step 814, a portion of the transcript is identified that starts at the first location (identified at step 706) and ends at the second location (identified at step 804).

Figure 8C:
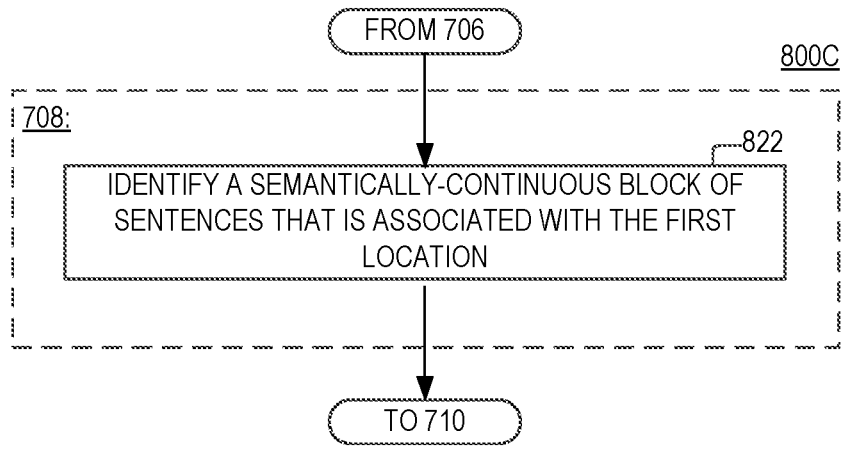

FIG. 8C shows an illustrative process 800C for identifying a portion of a transcript, as specified by step 708 of the process 700. In the example of FIG. 8C, the start and end of the portion are identified by performing natural language analysis on the transcript to isolate a semantically continuous block of sentences. In this regard, in the example of FIG. 8C, the start and end of the transcript portion are identified by using an NLP engine to identify a semantically continuous block sentence that includes the first location. At step 822, the note generator 424 identifies a semantically-continuous block of sentences that is associated with the first location. As noted above, the first location may be associated with a word in the transcript (obtained at step 704). In this regard, a semantically-continuous block of sentences that is associated with the first location may be a semantically-continuous block that includes the word. As noted above, the semantically-continuous block of sentences may include one or more sentences that concern the same topic. The semantically continuous block, at a minimum, may include a first sentence of which the word associated with the first location is part. Furthermore, the semantically-continuous block may optionally include one or more additional sentences that are spoken after the first sentence, and which concern the same topic as the first sentence. The determine semantic continuity, the note generator 424 may use the NLP engine 430 and/or any other suitable type of method. In some implementations, the semantically-continuous block of sentences may include only sentences that are consecutive.

In the example of FIGS. 4A-8C, the note generator 424 is executed on the device 402. However, alternative implementations are possible in which the note generator 424 is executed on a cloud platform or another device. In such implementations, the input detector 426 may be implemented as a client, which is executed on the same device/platform as the note generator 424, and which is configured to receive notifications when one or more types of input are detected at the device 402 and/or the wearable device 408. In some implementations, the input detector 426 may generate the first event (detected at step 702) in response to receiving a notification from the device 402 that a type of input has been detected at the device 402 (and/or the wearable device 408). Furthermore, the input detector 426 may generate the second event (detected at step 802) in response to receiving a notification from the device 402 that a type of input has been detected at the device 402 (and/or the wearable device 408). When the note generator 424 is executed on another device/platform, the note generator may determine what word is being output on the device 402 by monitoring what content is being provided to the device 402. For example, the note generator 424 receives an indication of the first event at time X, the note generator may determine (or estimate) that the word provided to the device 402 at time X-a was the word that was being output on a speaker of device 402 when the input associated with the first event was detected by device 402. The value of a may measure the latency at which content is output on a speaker of device 402 after it is transmitted to the device 402. Alternatively, when the note generator 424 is executed on another device/platform, the device 402 may be configured provide the note generator 424 with an indication of what word was being output on the speaker of the device 402 when the type of input was detected at the device 402 (and/or the wearable device 408). In some implementations, the NLP engine 430 and the speech-to-text engine 428 may be executed on the same remote device/platform as the note generator. Although in the example of FIG. 4C, the notes manager 423 is executed on device 402, alternative implementations are possible in which the notes manager 423 is executed on a device other than device 402 or a cloud platform, such as the cloud 304, which is shown in FIG. 3.

FIG. 9 shows a table 900, which shows examples of various types of input, which can be detected by the device 402, and which could be used to trigger or stop the generation of a note by the note generator 424. FIG. 9 illustrates that the type of input that might trigger the generation of a note by the note generator 424 may vary depending on the current context of device 402.

A start input may be an input gesture or motion (at the device 402) which triggers the generation of a first event (e.g., one of events 502/602 or the event detected at step 702). An end input may be an input gesture or motion (at the device 402) which triggers the generation of a second event (e.g., one of events 504/604 or the event detected at step 802). Table 900 includes rows 902-908. Each of rows 902-908 identifies a different set of inputs that can be used to trigger and stop the generation of a note by the note generator 424.

Row 902 indicates that the generation of a note may be triggered and stopped by respective shake motions that are performed by the device 402. Each shake motion may be detected by an accelerometer of the device 402. The first event (detected at step 702) may be triggered by a first signal that is output by the accelerometer, which indicates that the device 402 has been shaken (deliberately or intentionally) for a first time. The second event (detected at step 802) may be triggered by a second signal that is output by the accelerometer, which indicates that the device 402 has been shaken for a second time.

In the example of row 902, the first event (detected at step 702) and the second event (detected at step 802) are triggered by the same input gesture (i.e., a shake motion). However, alternative implementations are possible in which the first event and the second event are triggered by different input gestures. For example, in some implementations, the first event may be triggered by the user (deliberately or intentionally) performing a single shake of the device 402, and the second event may be triggered by the user (deliberately or intentionally) performing a double shake of the device 402.

Row 904 indicates that the generation of a note may be triggered and stopped by respective sliding gestures that are performed on a touchscreen of the device 402. Specifically, the first event (e.g., detected at step 706) may be triggered by a left sliding gesture that is performed on the touchscreen, and the second event (e.g., at step 802) may be triggered by a right sliding gesture that is performed on the touchscreen.

Row 906 indicates that the generation of a note may be triggered and stopped by respective touch gestures that are performed on a touchscreen of the device 402. Specifically, the first event (detected at step 702) may be triggered by a single tap that is performed on the touchscreen, and the second event (detected at step 802) may be triggered by a double-tap that is performed on the touchscreen.

Row 908 indicates that the generation of a note may be triggered and stopped by respective elbow-up gestures that are performed with the device 402. An elbow-up gesture may be performed by the user of the device 402 when the device 402 is strapped to the arm of the user (e.g., just above or below the elbow). An elbow-up gesture may be performed by the user raising his or her arm (or elbow). An elbow-up gesture may be detected by an accelerometer of the device 402 and/or another sensor of the device 402. An elbow-up gesture may be characterized in the device 402 moving in the opposite direction of the Earth's gravity, at a certain speed. The first event (detected at step 702) may be triggered by a first signal that is output by the accelerometer, which identifies that the device 402 has performed an elbow-up gesture for a first time. The second event (detected at step 802) may be triggered by a second signal that is output by the accelerometer, which identifies that the device 402 has performed an elbow-up gesture for a second time. As can be readily appreciated, shakes and elbow-up gestures may also be detected by using the wearable device 408.

In the example of row 908, the first event (detected at step 702) and the second event (detected at step 802) are triggered by the same input gesture (i.e., an elbow-up motion). However, alternative implementations are possible in which the first event and the second event are triggered by different input gestures. For example, in some implementations, the first event may be triggered by the user performing a one-second elbow-up action, and the second event may be triggered by the user performing a two-second elbow action. The one-second elbow-up action may be an action in which the user's elbow remains raised for less than 1 second, and the two-second action may be an action which the user's elbow remains raised for more than 2 seconds.

In another aspect, FIG. 9 indicates that the types of input gestures (or motions) that trigger the first and second events may depend on the current context of the device 402. For example, when the user of the device 402 is walking (while carrying the device 402), the first and second events may be generated in response to deliberate or intended shake motions of the device 402. As another example, when the user of the device 402 is traveling in a bus or train (while carrying the device 402), the first and second events may be generated in response to sliding gestures. As yet another example, when the user of the device 402 is running (while carrying the device 402), the first and second events may be generated in response to elbow-up gestures. When the user of the device 402 is neither walking, traveling, or running, the first and second events may be generated in response to touch input that is received at the device 402. In other words, the single-tap and double-tap gestures may be the default gestures that may trigger the first and second events (when the device 402 is not in a running, walking, or in-transit context). The context of the device 402 may be determined by the device 402 based on signals that are generated by one or more of the sensors 480.

FIGS. 1-9 are provided as an example only. At least some of the steps discussed with respect to FIGS. 1-9 can be performed in a different order, performed in parallel, or altogether omitted. Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FURTHER EXAMPLE EMBODIMENTS

The following examples pertain to further embodiments, from which numerous permutations and configurations are apparent.

Example 1 includes a method including: detecting a first event with use of a sensor, the first event to occur while audio data is output on a computing device, the audio data including speech; identifying a first location in a transcript of the speech from the audio data based on a signal from the sensor that detected an occurrence of the first event; identifying a portion of the transcript that includes the first location based on one or more timestamps that define the portion of the transcript relative to the first location; generating a link to audio that is associated with the extracted portion of the transcript; and providing the extracted portion of the transcript and the link to an application.

Example 2 includes the subject matter of Example 1, further including identifying a second location in the transcript, wherein the identified portion of the transcript starts at the first location and ends at the second location.

Example 3 includes the subject matter of Examples 1 and 2, wherein the identified portion of the transcript starts at the first location, and the first location including a starting word of a sentence in the transcript, the sentence being one that is being output during detection of the first event.

Example 4 includes the subject matter of Examples 1-3, wherein the identified portion of the transcript starts at the first location, and an extracted portion includes a semantically-continuous block of sentences, which the first location is part of, the semantically-continuous block of sentences including a sentence that is being output during detection of the first event.

Example 5 includes the subject matter of Examples 1-4, wherein the identified portion of the transcript starts at the first location, and the first location including a word in the audio data output before detection of the first event.

Example 6 includes the subject matter of Examples 1-5, wherein the identified portion of the transcript starts at the first location, and the first location including a word in the audio data that output after detection of the first event.

Example 7 includes the subject matter of Examples 1-6, wherein the identified portion of the transcript starts at the first location, and the first location corresponds to a word in the audio data that is being rendered when the first event is detected.

Example 8 includes the subject matter of Examples 1-7, wherein the first event is generated in response to an input gesture that is received at the computing device.

Example 9 includes a system including: a memory; and at least one processor operatively coupled to the memory, the at least one processor being configured to perform the operations of: detecting a first event with use of a sensor, the first event to occur while audio data is output on a computing device, the audio data including speech; identifying a first location in a transcript of the speech from the audio data based on a signal from the sensor that detected an occurrence of the first event; identifying a portion of the transcript that includes the first location based on one or more timestamps that define the portion of the transcript relative to the first location; generating a link to audio that is associated with the extracted portion of the transcript; and providing the extracted portion of the transcript and the link to an application.

Example 10 includes the subject matter of Example 9, wherein the at least one processor is further configured to perform the operation of identifying a second location in the transcript, wherein the identified portion of the transcript starts at the first location and ends at the second location.

Example 11 includes the subject matter of Examples 9-10, wherein the identified portion of the transcript starts at the first location, and the first location including a starting word of a sentence in the transcript, the sentence being one that is being output during detection of the first event.

Example 12 includes the subject matter of Examples 9-11, wherein the identified portion of the transcript starts at the first location, and an extracted portion includes a semantically-continuous block of sentences, which the first location is part of, the semantically-continuous block of sentences including a sentence that is being output during detection of the first event.

Example 13 includes the subject matter of Examples 9-12, wherein the identified portion of the transcript starts at the first location, and the first location including a word in the audio data output before detection of the first event.

Example 14 includes the subject matter of Examples 9-13, wherein the identified portion of the transcript starts at the first location, and the first location including a word in the audio data that output after detection of the first event.

Example 15 includes the subject matter of Examples 9-14, wherein the identified portion of the transcript starts at the first location, and the first location corresponds to a word in the audio data that is being rendered when the first event is detected.

Example 16 includes the subject matter of Examples 9-15, wherein the first event is generated in response to an input gesture that is received at the computing device.

Example 17 includes a non-transitory computer-readable medium storing one or more processor-executable instructions, which, when executed by at least one processor, cause the at least one processor to perform the operations of: detecting a first event with use of a sensor, the first event to occur while audio data is output on a computing device, the audio data including speech; identifying a first location in a transcript of the speech from the audio data based on a signal from the sensor that detected an occurrence of the first event; identifying a portion of the transcript that includes the first location based on one or more timestamps that define the portion of the transcript relative to the first location; generating a link to audio that is associated with the extracted portion of the transcript; and providing the extracted portion of the transcript and the link to an application.

Example 18 includes the subject matter of Example 17, wherein the one or more processor-executable instructions, when executed by the at least one processor, further cause the at least one processor to perform the operation of identifying a second location in the transcript, wherein the identified portion of the transcript starts at the first location and ends at the second location.

Example 19 includes the subject matter of Examples 17-18, wherein the identified portion of the transcript starts at the first location, and the first location including a starting word of a sentence in the transcript, the sentence being one that is being output during detection of the first event.

Example 20 includes the subject matter of Examples 17-19, wherein the identified portion of the transcript starts at the first location, and an extracted portion includes a semantically-continuous block of sentences, which the first location is part of, the semantically-continuous block of sentences including a sentence that is being output during detection of the first event.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:
1. A method comprising:
 detecting a first event with use of a sensor, the first event to occur while audio data is output on a computing device, the audio data including speech;
 generating a transcript of the audio data using a speech-to-text engine;
 identifying a first location in the transcript of the speech from the audio data based on a signal from the sensor that detected an occurrence of the first event;
 identifying a portion of the transcript that includes the first location based on one or more timestamps that define the portion of the transcript relative to the first location;
 generating a link to audio that is associated with the extracted portion of the transcript; and
 providing the extracted portion of the transcript and the link to an application;
 wherein the identified portion of the transcript starts at the first location, and an extracted portion includes a semantically-continuous block of sentences, which the first location is part of, the semantically-continuous block of sentences including a sentence that is being output during detection of the first event.

2. The method of claim 1, further comprising identifying a second location in the transcript, wherein the identified portion of the transcript starts at the first location and ends at the second location.

3. The method of claim 1, wherein the identified portion of the transcript starts at the first location, and the first location including a starting word of a sentence in the transcript, the sentence being one that is being output during detection of the first event.

4. The method of claim 1, wherein the identified portion of the transcript starts at the first location, and the first location including a word in the audio data output before detection of the first event.

5. The method of claim 1, wherein the identified portion of the transcript starts at the first location, and the first location including a word in the audio data that output after detection of the first event.

6. The method of claim 1, wherein the identified portion of the transcript starts at the first location, and the first location corresponds to a word in the audio data that is being rendered when the first event is detected.

7. The method claim 1, wherein the first event is generated in response to an input gesture that is received at the computing device.

8. A system comprising:
a memory; and
at least one processor operatively coupled to the memory, the at least one processor being configured to perform the operations of:
detecting a first event with use of a sensor, the first event to occur while audio data is output on a computing device, the audio data including speech;
generating a transcript of the audio data using a speech-to-text engine;
identifying a first location in the transcript of the speech from the audio data based on a signal from the sensor that detected an occurrence of the first event;
identifying a portion of the transcript that includes the first location based on one or more timestamps that define the portion of the transcript relative to the first location;
generating a link to audio that is associated with the extracted portion of the transcript; and
providing the extracted portion of the transcript and the link to an application;
wherein the identified portion of the transcript starts at the first location, and an extracted portion includes a semantically-continuous block of sentences, which the first location is part of, the semantically-continuous block of sentences including a sentence that is being output during detection of the first event.

9. The system of claim 8, wherein the at least one processor is further configured to perform the operation of identifying a second location in the transcript, wherein the identified portion of the transcript starts at the first location and ends at the second location.

10. The system of claim 8, wherein the identified portion of the transcript starts at the first location, and the first location including a starting word of a sentence in the transcript, the sentence being one that is being output during detection of the first event.

11. The system of claim 8, wherein the identified portion of the transcript starts at the first location, and the first location including a word in the audio data output before detection of the first event.

12. The system of claim 8, wherein the identified portion of the transcript starts at the first location, and the first location including a word in the audio data that output after detection of the first event.

13. The system of claim 8, wherein the identified portion of the transcript starts at the first location, and the first location corresponds to a word in the audio data that is being rendered when the first event is detected.

14. The system of claim 8, wherein the first event is generated in response to an input gesture that is received at the computing device.

15. A non-transitory computer-readable medium storing one or more processor-executable instructions, which, when executed by at least one processor, cause the at least one processor to perform the operations of:
detecting a first event with use of a sensor, the first event to occur while audio data is output on a computing device, the audio data including speech;
generating a transcript of the audio data using a speech-to-text engine;
identifying a first location in the transcript of the speech from the audio data based on a signal from the sensor that detected an occurrence of the first event;
identifying a portion of the transcript that includes the first location based on one or more timestamps that define the portion of the transcript relative to the first location;
generating a link to audio that is associated with the extracted portion of the transcript; and
providing the extracted portion of the transcript and the link to an application;
wherein the identified portion of the transcript starts at the first location, and an extracted portion includes a semantically-continuous block of sentences, which the first location is part of, the semantically-continuous block of sentences including a sentence that is being output during detection of the first event.

16. The non-transitory computer-readable medium of claim 15, wherein the one or more processor-executable instructions, when executed by the at least one processor, further cause the at least one processor to perform the operation of identifying a second location in the transcript, wherein the identified portion of the transcript starts at the first location and ends at the second location.

17. The non-transitory computer-readable medium of claim 15, wherein the identified portion of the transcript starts at the first location, and the first location including a starting word of a sentence in the transcript, the sentence being one that is being output during detection of the first event.

* * * * *